United States Patent [19]

Overzet et al.

[11] 4,139,885

[45] Feb. 13, 1979

[54] FAULT PROTECTION CIRCUIT

[75] Inventors: John K. Overzet, Elmhurst; George H. Studtmann, Mount Prospect, both of Ill.

[73] Assignee: Borg-Warner Corporation, Chicago, Ill.

[21] Appl. No.: 808,203

[22] Filed: Jun. 20, 1977

[51] Int. Cl.² .............................................. H02M 1/18
[52] U.S. Cl. ...................................... 363/58; 363/37
[58] Field of Search ................ 363/34, 37, 50, 52–58, 363/135–138

[56] References Cited

U.S. PATENT DOCUMENTS

| 3,321,697 | 5/1967 | Etter | 363/135 |
|---|---|---|---|
| 3,413,538 | 11/1968 | Hodges | 363/54 X |
| 3,553,567 | 1/1971 | Pesce et al. | 363/54 |
| 3,711,759 | 1/1973 | Krauthamer | 363/57 |
| 3,947,748 | 3/1976 | Klein | 363/57 |
| 4,019,116 | 4/1977 | Klautschek | 363/37 X |
| 4,042,871 | 8/1977 | Grubbs et al. | 363/37 X |
| 4,066,954 | 1/1978 | Vukasovic et al. | 363/37 |

Primary Examiner—William M. Shoop
Attorney, Agent, or Firm—James J. Jennings

[57] ABSTRACT

An a-c supply system includes an input bridge circuit, connected to receive a-c input voltage and produce an output d-c voltage which is passed through a filter to an inverter having a plurality of thyristor switches, which switches are regulated to produce an a-c output voltage for supplying a load. If two of the switches are inadvertently triggered on to produce a fault across the bus, the rapid discharge of the filter capacitor into this fault is sensed, and the protection circuit provides both simultaneous turn-on of all of the inverter power switches, and turn-off of the input bridge. The input bridge turn-off is achieved by simultaneous removal of the gate drive from all the power switches in the input bridge and commutation of all the power switches in the input bridge circuit, or by interrupting power transfer from the input bridge toward the inverter. In addition to sensing the filter capacitor current, the level of current supplied to the input bridge is monitored so that a sudden rise is detected and utilized to initiate the same protective functions.

22 Claims, 6 Drawing Figures

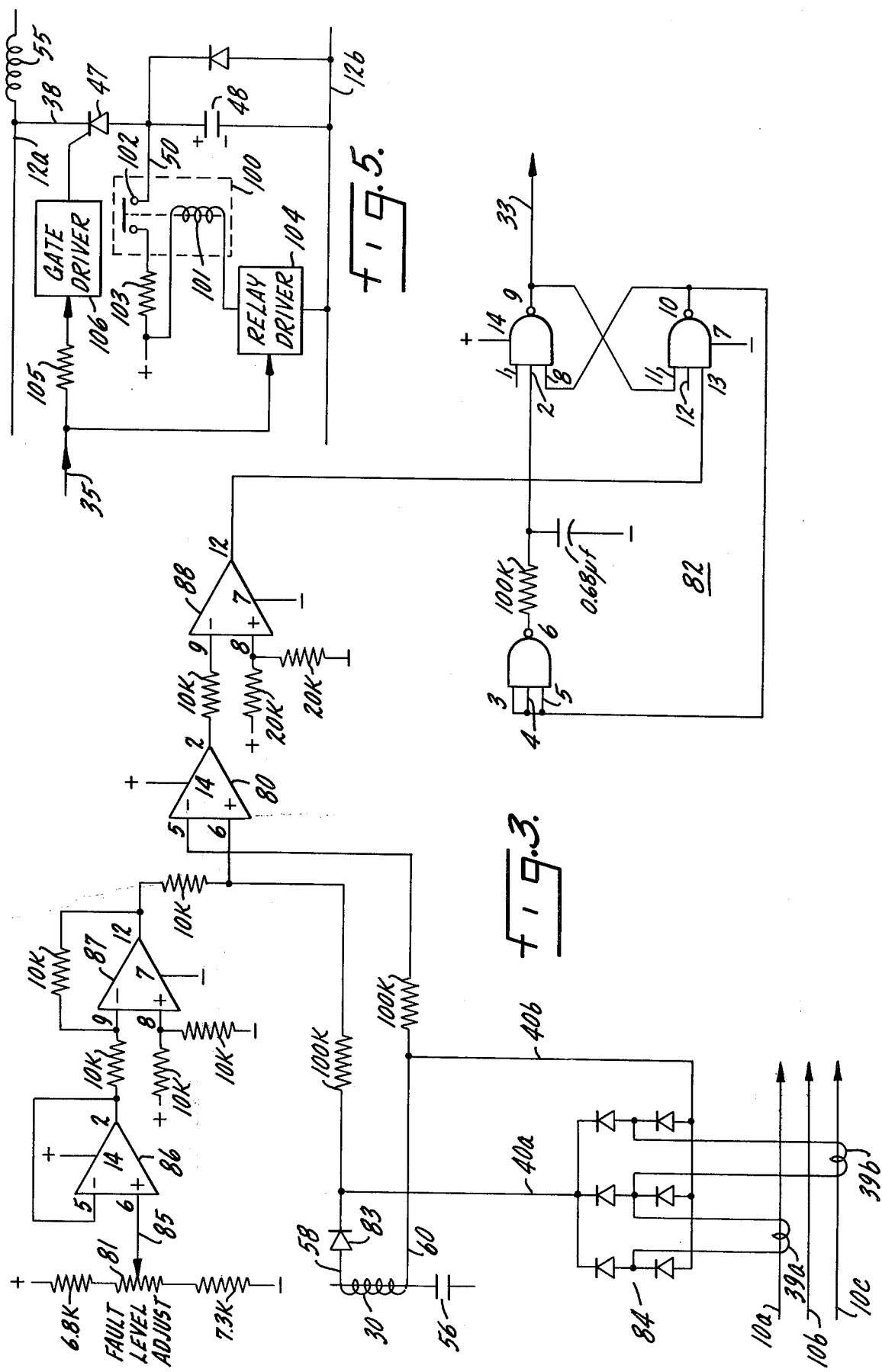

fig.6.

FAULT PROTECTION CIRCUIT

BACKGROUND OF THE INVENTION

The field of a-c power delivery, with good control of both the frequency and the amplitude of the a-c energy delivered to a load such as a motor, is now well developed. The significant improvement of thyristors and power transistors in recent years has upgraded the voltage, current, and power ratings of the semiconductor devices. It is desirable to operate these units near their maximum ratings when a high power level is to be delivered to large loads, such as induction motors requiring several hundred kilowatts of energy input. In conventional inverters, usually two or four power-handling thyristors are connected in each individual phase circuit, and are switched on and off at the appropriate times to deliver an alternating output voltage from a d-c input. If, however, two power-handling devices in any given phase circuit are inadvertently triggered on at the same time, this produces a short circuit or fault across the bus, and a consequent very high current flow through this short. This sudden, very high current can burn out the semiconductor devices very rapidly. Hence, it is desirable to sense the onset of the fault condition and take corrective action to prevent damage to these expensive powerhandling semiconductors.

The "brute-force" approach is to sense a current increase, and blow a fuse to protect the semiconductor unit. Of course, this requires manual replacement of the fuses, and prevents automatic restarting. One approach taken in the past has been to simultaneously gate on all the thyristors or power switches in the inverter when the fault current is sensed. This effectively forces sharing of the total fault current through a plurality of current paths in the individual phase circuits, and tends to reduce the likelihood of damage to any given semiconductor device. However, even this step has not proved completely effective in providing the desired degree of protection for these semiconductor power-handling units.

It is therefore a primary object of the present invention to provide a fault protection circuit for an inverter, having a plurality of power thyristors, which is more effective in its protective operation than previously devised circuits.

Another important object of the invention is to provide such a protection circuit which not only initially forces current sharing among the inverter power-handling devices, but also prevents the continued feeding of fault current into the inverter.

A corollary object of the invention is to provide such a protective arrangement in which the feeding of the fault current is interrupted, without blowing a fuse.

SUMMARY OF THE INVENTION

A fault protection system, according to this invention, is useful with an a-c energy supply system having an inverter with a plurality of power switches connected to supply a-c output energy. A filter is connected to pass d-c energy toward the inverter, and an input bridge has a plurality of power switches connected to receive a-c input energy and to pass d-c energy to the filter. Means is provided for regulating operation of the input bridge and the inverter. The fault protection system includes a fault current detector, connected to compare the level of the current passed from the filter toward the inverter against a preset reference. When the filter current level exceeds the preset reference, a fault signal is produced to turn on all the switches in the inverter and effect sharing of the excess current.

Particularly in accordance with this invention, the fault signal also effects removal of the gate drive from the power switches in the input bridge, and commutates all the power switches in the input bridge. Alternatively, the input bridge can be "shut off" by opening the circuit between the input bridge and the inverter.

In accordance with another aspect of the invention, the fault current detector also compares the level of the a-c current supplied to the input bridge against the preset reference level, to turn on the inverter switches and turn off the input bridge when the level of the a-c input current exceeds the preset reference level.

THE DRAWINGS

In the several figures of the drawings, like reference numberals identify like components, and in those drawings:

FIGS. 2, 3, 4 and 5 are schematic diagrams setting out circuit details of the arrangement shown more generally in FIG. 1; and FIG. 6 is a block diagram depicting another embodiment of the invention.

GENERAL SYSTEM DESCRIPTION

Figure 1:
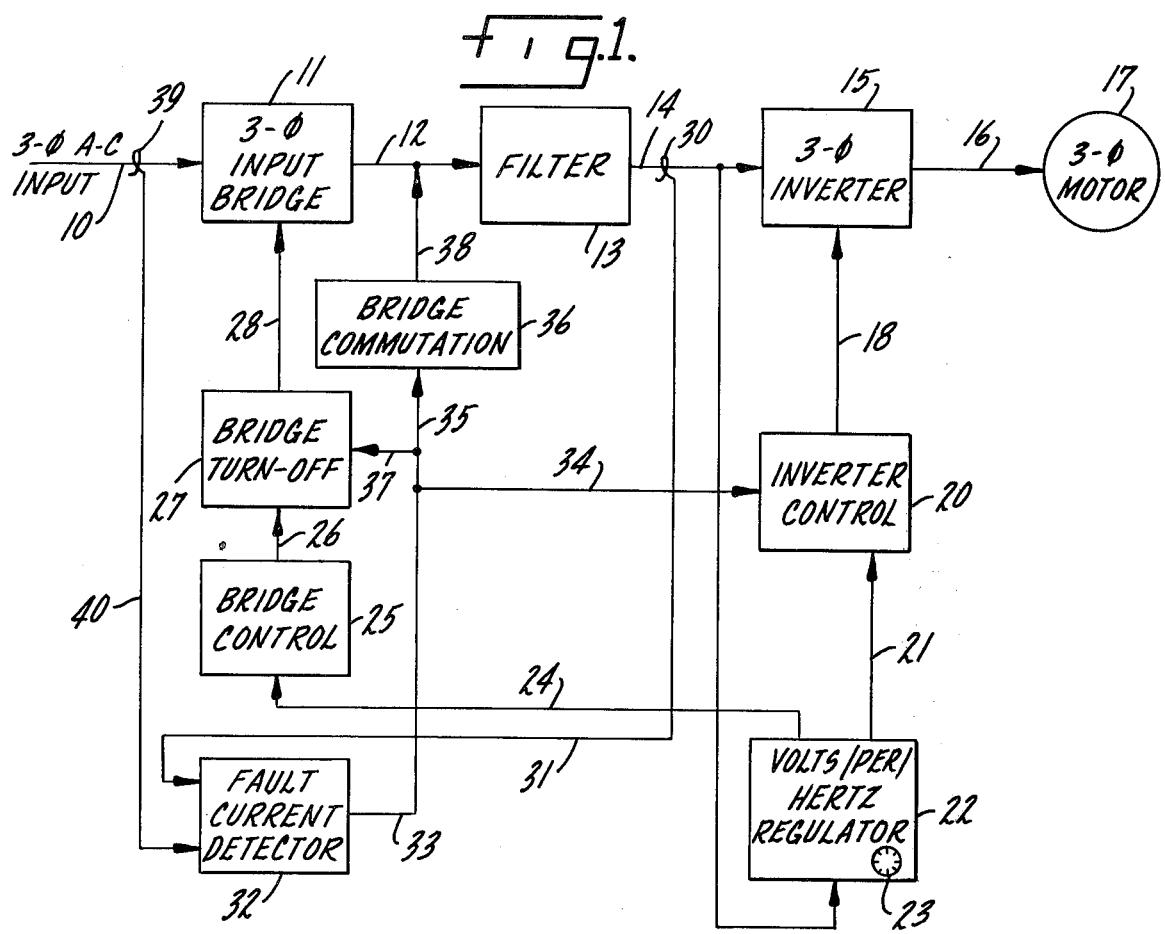
FIG. 1 is a block diagram of a fault protection circuit according to this invention in conjunction with a power delivery system.

As shown in FIG. 1, three-phase a-c input energy is supplied over a plurality of conductors, represented by line 10, to a three-phase input bridge 11. This bridge is a conventional circuit, including a plurality of power switches connected such that appropriate turn-on and turn-off of these switches produces d-c energy on line 12, which is passed to filter circuit 13. In turn, the filter circuit passes d-c energy over line 14 to a three-phase inverter 15, which provides controlled three-phase energy over line 16 to power the motor 17. While disclosed in connection with a three-phase system, those skilled in the art will appreciate that the principles of the present invention are applicable to single-phase, and other multiple-phase, systems in addition to the described three-phase arrangement.

The frequency of the a-c voltage on line 16 is regulated by the application of appropriately timed gating or turn-on pulses over line 18 to the power switches in the three-phase inverter 15. In turn, these gating signals are provided from inverter control circuit 20, another conventional unit which often comprises an oscillator and a ring-counter type circuit to regulate operation of the power switches. In turn, the inverter control circuit is regulated by a signal, generally a d-c signal, received over line 21 from a regulator circuit 22. This circuit can include some means, represented by the knob 23, for setting the desired amplitude (volts) and frequency (hertz), and thus the volts/hertz ratio, of the voltage supplied to the a-c load. This is done by providing not only the frequency-regulating signal over line 21, but also supplying a voltage amplitude reguliting signal over line 24. This latter signal governs bridge control circuit 25 which provides a signal on line 26, for passage through the bridge turn-off circuit 27 and line 28, to regulate gating of the switches in the input bridge circuit 11. This, in turn, controls the amplitude of the d-c voltage passed through the filter to effect a corresponding regulation of the amplitude of the a-c output voltage from the inverter. Bridge turn-off circuit 27 is normally a short circuit and passes signals directly from the bridge control circuit 25 to the input bridge 11.

A current transformer 30, depicted by a single turn, is positioned to sense the amplitude of the current flow from the filter to the three-phase inverter, and provides a signal related to this current amplitude over line 31 to fault current detector circuit 32. Detector circuit 32 is effective to compare the level of the current on line 31 against a preset reference level and, when the actual current level exceeds the preset reference level, provides an ouput "fault" signal on line 33. This fault signal is passed over line 34 to inverter control circuit 20, providing firing pulses to all the power devices in inverter 15, thus gating on these switches and providing a plurality of paths to share the fault current. However, it is apparent that even with this sharing of the fault current, the input bridge and filter, unless otherwise modified in their operation, will continue to transfer current from the a-c input line 10 to the inverter input bus.

Thus, in accordance with this invention, the input bridge 11 is also shut off. In this embodiment the fault signal on line 33 is also passed over line 35 to the bridge commutation circuit 36, and over line 37 to bridge turn-off circuit 27. The signal on line 37 effectively opens the circuit through bridge turn-off unit 27, removing gate drive from the power devices within the input bridge 11. At the same time bridge commutation circuit 36 passes energy over line 38 to apply a reverse voltage across the thyristors within input bridge 11, and these thyristors are commutated off. Thus, not only is instantaneous current sharing provided in the inverter to minimize possibility of destroying any single thyristor, but at the same time the input bridge is effectively "opened" by commutating off the switches in this bridge and removing the gate drive, thus preventing continued feeding of current from the a-c input line into the system. Filter 13 includes a series-connected inductor (55, FIG. 2). If only the gate drive were removed from input bridge 11, and the bridge thyristors were not commutated off, these thyristors would still turn off within a half-cycle, when the input a-c voltage reverses polarity. However, before the half-cycle ends, the series inductor would have saturated and passed a very large current to the inverter. To prevent the saturation, the filter choke would have to be very large, and this is a costly item. For a reasonably-sized choke, it is thus requisite to commutate the power switches in the input circuit, in addition to removing the gate drive. With this general perspective of the system arrangement, a more detailed description of the particular circuit components and functions will now be set out.

DETAILED DESCRIPTION OF THE INVENTION

Figure 2:
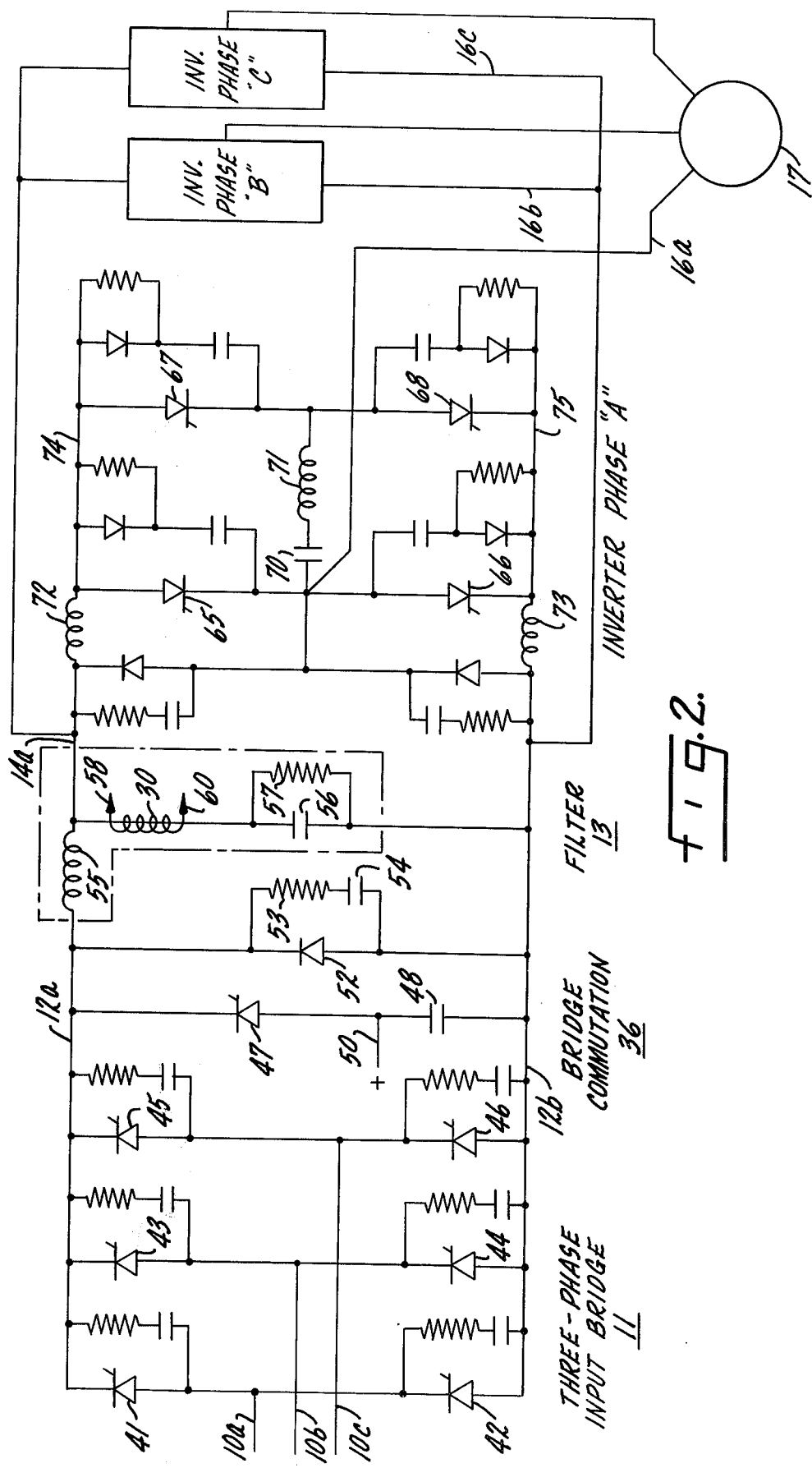

As shown in FIG. 2, three-phase a-c input energy is supplied over the lines 10a, 10b and 10c to the input bridge 11, which includes six thyristors 41-46 connected in a conventional arrangement to supply d-c output energy on the bus conductors 12a, 12b at a level determined by the selective gating of the individual power thyristors 41-46 in a well known manner. The resistor-capacitor snubber circuits adjacent the power thyristors are not identified, as they are conventional components and such arrangements can be implemented in many different ways.

In accordance with one aspect of the invention, a bridge commutation circuit 36 includes another power semi-conductor 47 coupled in series with a capacitor 48 between the bus conductors 12a and 12b. A d-c voltage supply circuit (not shown in this view) supplies a voltage with the polarity indicated between conductors 50, 12b to charge capacitor 48. Thus, when thyristor 47 is gated on, capacitor 48 is rapidly connected to the bus, providing a reverse voltage to commutate thyristors 41-46. A reactive diode 52 is connected as shown between the bus conductors, and a series circuit including resistor 53 and capacitor 54 is coupled in parallel with this diode.

Filter 13 includes a series-connected inductor 55, coupled between conductor 12a and conductor 14a. The filter also includes parallel-connected capacitor 56, connected as shown between conductors 14a and 12b, and a bleeder resistor 57 is connected across capacitor 56. Current transformer 30 is shown connected to sense the current which flows upwardly from capacitor 56 when this capacitor is discharged, to provide a signal on lines 58, 60 indicative of this current flow. In FIG. 1 the winding 30 was shown in series with the bus conductor 14a. It is evident that if capacitor 56 discharges over conductor 14a at the input of the inverter phase circuits, this discharge current can be sensed either with the winding disposed as shown on FIG. 2 or in the position depicted in FIG. 1.

The inverter 15 includes three individual phase circuits, and the schematic details of the Phase A circuit are set out in FIG. 2. In that the circuit arrangements of the B and C phases are identical, they are set out in only block arrangement. The Phase A circuit includes four power thyristors 65, 66, 67 and 68, connected as shown in an auxiliary-commutated (aux-comm) arrangement. Thyristors 65 and 66 are the main switches for passing the load current from the bus conductors to or from the load conductor 16a. The snubber circuits are again conventional and thus are not further identified. However, in addition to the commutation capacitor 70 connected in the A phase, there is a first inductor 71 connected in series with this capacitor between the main thyristors and the auxiliary thyristors, and second and third inductors 72, 73 coupled between the input bus conductors and conductors 74, 75 as shown. In an embodiment successfully built and tested, with the commutating capacitor 70 having a value of 80 microfarads, inductor 71 was 7.5 microhenries, and each of inductors 72, 73 was 11 microhenries for effective operation of an aux-comm circuit such as shown in FIG. 2.

Although the inverter 15 is represented as an aux-comm inverter, it will be apparent that the principles and implementation of this invention are equally applicable to bridge inverter circuits. The main thyristors in a bridge inverter are generally connected in series between the bus conductors, and by gating on all of the power thyristors in the bridge inverter, this effects current sharing between the phases and militates against destruction of any one semiconductor device.

The main power flow through the system of FIG. 1 occurs through the circuit components shown in FIG. 2. Selective gating of the thyristors 41-46 in the three-phase input bridge 11, when a-c input energy appears on the conductors 10a, 10b and 10c, provides a d-c output voltage, which is positive on conductor 12a with respect to the voltage on the common conductor 12b. Capacitor 56 was a 30,000 microfarad capacitor in this configuration.

FIG. 3 illustrates the fault current detector circuit 32, which monitors the current flow from the capacitor 56 and the input a-c current flow on conductors 10a–10c, compares these current levels in a comparator stage 80 against a reference level preset by a potentiometer 81, and triggers a one-shot multivibrator circuit 82 to provide an output signal on line 33 when excess current is detected. Considering first any discharge current from the capacitor 56, such current flow is sensed in the current transformer 30 to provide a signal on lines 58, 60 which passes through diode 83, the 100K resistors, and is applied to the input terminals of comparator stage 80. In an analagous manner the a-c input current on two of the three input lines is sensed by the current transformers 39a and 39b. Two of the three input phase signals are sufficient, as the third phase signal is the algebraic combination of the first two phases. The resultant signal is rectified in the diode bridge circuit 84 to provide an output signal on lines 40a, 40b. This signal is coupled in parallel with the signal from the current transformer 30, and is applied over the 100K resistors to the input of comparator stage 80.

The fault level adjust potentiometer 81 in the illustrated embodiment was a 1K unit, coupled between the resistors as illustrated. In the circuit the + symbol represents a voltage which is 15 volts positive with respect to that represented by the minus symbol. The fault level signal from potentiometer 81 is applied over line 85 to one input connection of operational amplifier (op amp) 86, and passed through buffer stage 87 to the comparator 80. The output of the comparator stage is passed through another buffer stage 88 to the input of the one-shot circuit 82. In this arrangement each of the three NAND circuits shown in the one-shot was a three-input NAND, and all three NAND's were part of a 4023 circuit. Stages 80, 88 were a 1458 dual op amp, and stages 86, 87 were also a 1458 dual op amp. Each time an excess current, either from capacitor 56 or from the input a-c lines, is sensed this causes op amp 80 to switch, providing a signal which causes the flip-flop 82 to change state and provide a zero, or low-voltage, output signal on line 33.

Figure 4:
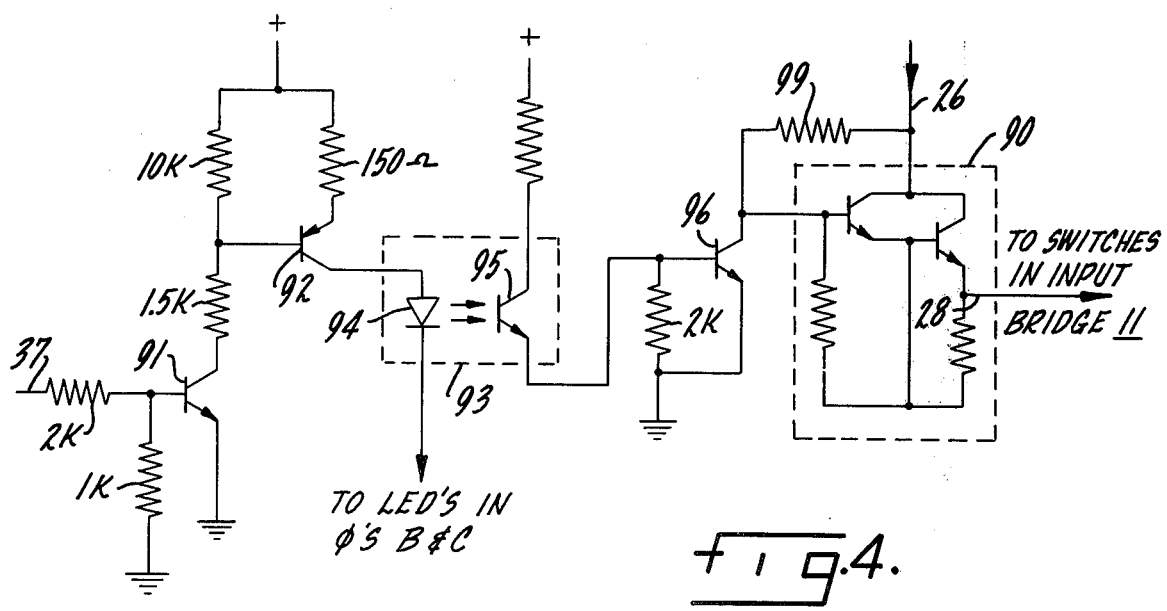

FIG. 4 illustrates the circuit details of the bridge control turn-off circuit 27. As there shown the gate signals supplied by the bridge control circuit 25 are normally passed through a Darlington pair circuit 90, which is normally conducting to pass the gate signals directly over line 28 to the switches in the phase A circuit of input bridge 11. The + sign in FIG. 4 represents a signal which is 12 volts positive with respect to ground. Normally both transistors 91 and 92 are off, and thus there is no drive to the light-emitting diode (led)-transistor combination 93. Thus in this condition any input signal on line 26 rapidly drives on the Darlington pair and provides the gate signal over line 28.

When a fault signal occurs, this signal is inverted and used to drive on transistor 91, providing a negative-going signal which in turn drives on transistor 92. This completes a circuit for the led 94, which in turn gates on transistor 95. The transistor 95 in turn switches on the NPN transistor 96. Thus any signal now appearing on conductor 26 "sees" only a single base-emitter junction through transistor 96 to ground, a much smaller impedance than that through the two series-connected base-emitter junctions in the Darlington pair. This effectively shorts any incoming gate signal to ground, removing the gate drive from the power switches in the input bridge whenever a fault signal is supplied by the fault current detector. Those skilled in the art will recognize that other circuits could readily be implemented to effectively block application of the gate signals to the input bridge whenever a fault signal is provided.

In addition to removing the gate drive from the input bridge, it is necessary to turn off the then-conducting thyristors to prevent further power transfer to the inverter. This is accomplished with a circuit arrangement shown in FIG. 5. As there indicated, relay 100 includes a winding 101 and a contact set 102, which when closed completes a charging circuit over resistor 102 to charge capacitor 48 with the voltage of the polarity indicated. In a preferred embodiment of the invention, capacitor 48 was a 5,000 microfarad, 1 kilovolt capacitor. The circuit within relay driver stage 104 was such as to normally complete a path in series with winding 101, absent a signal on line 35. Thus a fault signal provided by the detector circuit 32 and passed over line 35 is applied over resistor 105 to the gate driver circuit 106, rapidly turning on the thyristor 47 and using the charge accumulated on capacitor 48 to commutate off the input bridge thyristors. The series-connected inductor 55 in the filter circuit provides isolation from the short circuit in the inverter. At the same time that the thyristor 47 is gated on, the fault signal switches off relay driver 104, de-energizing relay 100 and allowing the contact set 102 to open. Different arrangements can be devised to provide for charging of capacitor 48, and the appropriate disconnection of the charging circuit when the commutating thyristor 47 is fired.

The circuit for using the fault signal on line 33 to gate on all the power switches in the inverter 15 is not illustrated because of its simplicity and because it can be implemented in many different ways. For example, the fault signal on lines 33, 34 can be connected, through OR circuits, with the normal output gating signals from the inverter control circuit 20. Those skilled in the art will readily appreciate and implement such a control arrangement.

Figure 6:
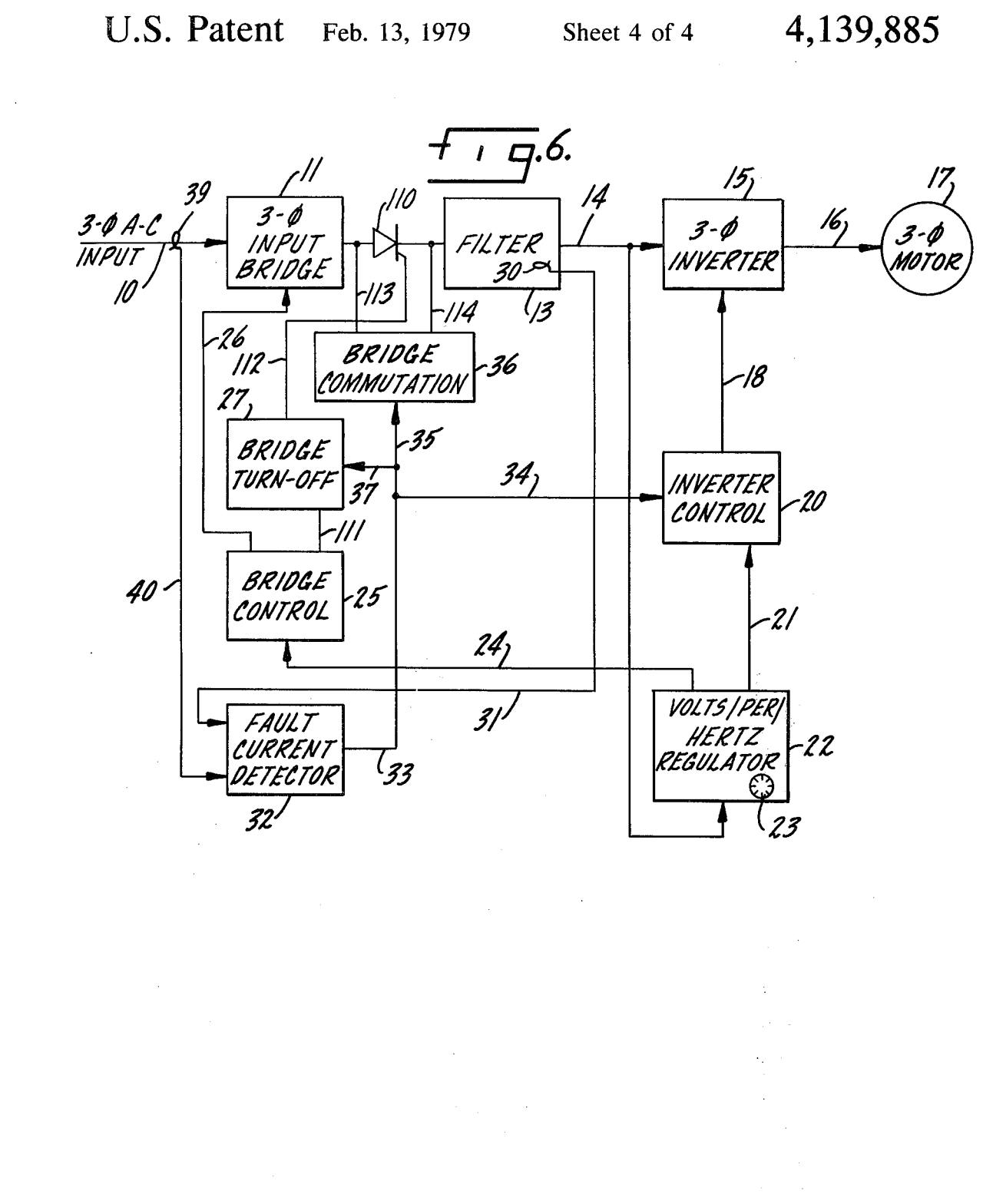

An alternative arrangement for turning off the input bridge is shown in FIG. 6. A thyristor 110 is coupled in series between input bridge 11 and the inverter. As shown, it is between the input bridge and filter 13. When the system is energized, bridge control circuit 25 passes a gating signal over line 111, a path in bridge turn-off circuit 27, and over line 112 to the gate of thyristor 110. The normal gate control signals for the thyristors in input bridge 11 are passed directly from bridge control circuit 25 over line 26 to input bridge 11. When a fault signal is produced (as described above), this signal is applied to lines 35 and 37. The signal on line 37 causes the bridge turn-off circuit 27 to remove the gate drive from thyristor 110, and the signal on line 35 causes bridge commutation circuit 36 to apply a reverse voltage, over lines 113 and 114, which turns off thyristor 110 and interrupts the path for energy transfer between the input bridge and the inverter. At the present time the arrangement shown in FIG. 1, in which gate drive is removed from the input bridge thyristors and these thyristors are commutated, is the preferred embodiment of the invention.

Technical Advantages

The present invention provides an effective arrangement for protecting the power semiconductors in a multi-phase inverter from destruction by an inadvertent fault, such as is sometimes caused by a noise pulse. When such a fault occurs and the discharge current from capacitor 56 begins to rise, this current increase is sensed (over line 31) and the fault current detector 32 provides an output fault signal on line 33 which accomplishes three functions. All the power semiconductors in the inverter are immediately gated on, to share the fault current and minimize the possibility of the destroying any one semiconductor. In a three-phase aux-comm inverter, this means there are six parallel paths for sharing the fault current. However, even with this sharing, the normal energizing arrangements continue to transfer input energy through the bridge and filter to "feed" the fault. Thus an important advantage of the invention is the use of the fault signal to actuate bridge commutation circuit 36 and turn off input bridge 11, while energizing the bridge turn-off circuit 27 to remove the gate drive from all the power switches in the input bridge. This has proved very effective in protecting the inverter semiconductors, by simultaneously switching off the input bridge at the same time the fault current is being shared through a plurality of parallel paths.

It is important to note the significant advantage of sensing current in the capacitor leg (parallel path) of the filter (see FIG. 2) as the preferred mode of practicing the invention. If the current sensing is done in the series path, as shown generally in FIG. 1, then the sensing system must also handle the average d-c component of the current passed toward the inverter. The system of FIG. 2 avoids the d-c component of the current supplied to the inverter, and need only handle the transient fault current. This means the current sensing arrangement can be smaller and more economical than would otherwise be the case.

If the current transformer 30 is positioned as shown in FIG. 2, rather than in series with the bus conductor 14a, it would be possible for the inverter to "lock on" with a short at start-up before filter capacitor 56 is charged, and there would not be sufficient energy available to provide a current signal over current transformer 30. Thus another important advantage of the invention is realized by sensing the level of the a-c input current delivered to the input bridge, which rises very rapidly if there is a fault at start-up. This arrangement provides an alternate check of the current level flow through the system, and likewise provides an outout fault signal from the fault current detector if the input a-c current exceeds a preset level.

It is again emphasized that sensing the current in the capacitor leg of the filter eliminates the average d-c component of the sensed current, simplifying the transformer arrangement. Of course a series current sensing arrangement could be used, with a current shunt, or a transformer device having an air gap, or a Hall effect device, or some other sensing arrangement.

Those skilled in the art will appreciate that it may not be necessary to turn on all the inverter switches, when a fault is detected, to protect those switches. For example, each inverter thyristor could be greatly oversized, to handle the fault current. Under these conditions there is utility in a protective system which operates only to interrupt energy transfer through the bridge toward the inverter, without modifying the inverter operation. Alternatively protective thyristors could be coupled between the inverter bus conductors, to be gated on when a fault is detected and share the fault current.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A protection system for use with an a-c energy supply system including an inverter having a first plurality of switches connected to supply a-c output energy, a filter connected to pass d-c energy toward the inverter, an input bridge having a second plurality of switches connected to receive a-c input energy and to pass d-c energy to the filter, and means for regulating operation of the input bridge and the inverter, which protection system comprises a fault current detector, connected to compare the level of the current passed from the filter toward the inverter against a preset reference, to provide a fault signal to turn on all the switches in the inverter, thus sharing the excess current, and simultaneously to interrupt energy transfer through the input bridge toward the inverter, and in which the filter passes a series current toward the inverter, and the level of this series current is sensed to provide a current level signal to the fault current detector, characterized in that the second plurality of switches in the input bridge are turned on by gate signals and are turned off by a reverse voltage, in which energy transfer through the input bridge is interrupted by removing the gate signals and applying the reverse voltage.

2. A protection system for use with an a-c energy supply system including an inverter having a first plurality of switches connected to supply a-c output energy, a filter connected to pass d-c energy toward the inverter, an input bridge having a second plurality of switches connected to receive a-c input energy and to pass d-c energy to the filter, and means for regulating operation of the input bridge and the inverter, which protection system comprises a fault current detector, connected to compare the level of the current passed from the filter toward the inverter against a preset reference, to provide a fault signal to turn on all the switches in the inverter, thus sharing the excess current, and simultaneously to interrupt energy transfer through the input bridge toward the inverter, and in which the filter passes a series current toward the inverter, and the level of this series current is sensed to provide a current level signal to the fault current detector, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

3. A protection system for use with an a-c energy supply system including an inverter having a first plurality of switches connected to supply a-c output energy, a filter connected to pass d-c energy toward the inverter, an input bridge having a second plurality of switches connected to receive a-c input energy and to pass d-c energy to the filter, and means for regulating operation of the input bridge and the inverter, which protection system comprises a fault current detector, connected to compare the level of the current passed from the filter toward the inverter against a preset reference, to provide a fault signal to turn on all the switches in the inverter, thus sharing the excess current, and simultaneously to interrupt energy transfer through the input bridge toward the inverter, in which the filter includes a parallel-connected component, and the level of the current through the parallel-connected component is sensed to provide a current level signal to the fault-current detector.

4. A protection system as claimed in claim 3, in which the second plurality of switches in the input bridge are turned on by gate signals and are turned off by a reverse voltage, in which energy transfer through the input bridge is interrupted by removing the gate signals and applying the reverse voltage.

5. A protection system as claimed in claim 3, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

6. A protection system as claimed in claim 3, in which the fault current detector also compares the level of the a-c current supplied to the input bridge against a preset reference level, to turn on all the inverter switches and interrupt energy transfer through the input bridge when the level of the a-c input bridge current exceeds the preset reference level.

7. A protection system as claimed in claim 6, in which the second plurality of switches in the input bridge are turned on by gate signals and are turned off by a reverse voltage, in which energy transfer through the input bridge is interrupted by removing the gate signals and applying the reverse voltage.

8. A protection system as claimed in claim 6, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

9. A protection system for use with a system for supplying multi-phase a-c energy from a multi-phase inverter having a plurality of power switches, a multi-phase input bridge, for receiving input a-c energy and providing d-c energy, which input bridge also has a plurality of power switches, and a filter, comprising a series-connected inductor and a parallel-connected capacitor, which filter is coupled between the input bridge and the inverter, which protection system comprises:
   a fault current detector, including an adjustable component for presetting a reference current level, and means for comparing an input signal with the reference level to determine when an output fault signal should be issued;
   means for sensing the discharge current from the filter capacitor toward the inverter, to provide said input signal to the fault current detector; and
   means, coupled to the output side of the fault current detector, connected to utilize the output fault signal to turn on all the power switches in the inverter to share the fault current, and to interrupt energy transfer through the input bridge toward the inverter.

10. A protection system as claimed in claim 9, in which a bridge control circuit is connected to supply gate signals for the input bridge power switches, characterized by a bridge turn-off circuit coupled between the bridge control circuit and the input bridge, a bridge commutation circuit coupled to the input bridge, and means for applying the output fault signal both to the bridge turn-off circuit and to the bridge commutation circuit, removing the gate signals from the input bridge power switches and turning off the power switches.

11. A protection system as claimed in claim 9, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

12. A protection system as claimed in claim 9, in which means is provided to sense the level of the a-c current supplied to the input bridge and thus provide a second input signal to the fault current detector, which second input signal is also compared against the reference current level signal to provide an output fault signal when the a-c input current level to the input bridge exceeds the preset reference current level.

13. A protection system as claimed in claim 12, in which a bridge control circuit is connected to supply gate signals for the input bridge power switches, characterized by a bridge turn-off circuit coupled between the bridge control circuit and the input bridge, a bridge commutation circuit coupled to the input bridge, and means for applying the output fault signal both to the bridge turn-off circuit and to the bridge commutation circuit, removing the gate signals from the input bridge power switches and turning off the power switches.

14. A protection system as claimed in claim 12, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

15. A protection system for use with an a-c energy supply system including an inverter having a plurality of switches connected to supply a-c output energy, a filter connected to pass d-c energy toward the inverter, an input bridge having a plurality of switches connected to receive a-c input energy and to pass d-c energy to the filter, and means for regulating operation of the input bridge, which protection system comprises a fault current detector, connected to compare the level of the current passed from the filter toward the inverter against a preset reference, to provide a fault signal to interrupt energy transfer through the input bridge toward the inverter, and in which the filter passes a series current toward the inverter, and the level of this series current is sensed to provide a current level signal to the fault current detector, characterized in that the plurality of switches in the input bridge are turned on by gate signals and are turned off by a reverse voltage, in which energy transfer through the input bridge is interrupted by removing the gate signals and applying the reverse voltage.

16. A protection system for use with an a-c energy supply system including an inverter having a plurality of switches connected to supply a-c output energy, a filter connected to pass d-c energy toward the inverter, an input bridge having a plurality of switches connected to receive a-c input energy and to pass d-c energy to the filter, and means for regulating operation of the input bridge, which protection system comprises a fault current detector, connected to compare the level of the current passed from the filter toward the inverter against a preset reference, to provide a fault signal to interrupt energy transfer through the input bridge toward the inverter, and in which the filter passes a series current toward the inverter, and the level of this series current is sensed to provide a current level signal to the fault current detector, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

17. A protection system for use with an a-c energy supply system including an inverter having a plurality of switches connected to supply a-c output energy, a filter connected to pass d-c energy toward the inverter, an input bridge having a plurality of switches connected to receive a-c input energy and to pass d-c energy to the filter, and means for regulating operation of the input bridge, which protection system comprises a fault current detector, connected to compare the level of the current passed from the filter toward the inverter against a preset reference, to provide a fault signal to interrupt energy transfer through the input bridge toward the inverter, in which the filter includes a parallel-connected component, and the level of the current through the parallel-connected component is sensed to provide a current level signal to the fault current detector.

18. A protection system as claimed in claim 17, in which the plurality of switches in the input bridge are turned on by gate signals and are turned off by a reverse voltage, in which energy transfer through the input bridge is interrupted by removing the gate signals and applying the reverse voltage.

19. A protection system as claimed in claim 17, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

20. A protection system as claimed in claim 17, in which the fault current detector also compares the level of the a-c current supplied to the input bridge against a preset reference level, to interrupt energy transfer through the input bridge when the level of the a-c input bridge current exceeds the preset reference level.

21. A protection system as claimed in claim 20, in which the plurality of switches in the input bridge are turned on by gate signals and are turned off by a reverse voltage, in which energy transfer through the input bridge is interrupted by removing the gate signals and applying the reverse voltage.

22. A protection system as claimed in claim 20, and further comprising a thyristor coupled in series between the input bridge and the inverter, and a commutating circuit coupled to the thyristor, in which energy transfer through the input bridge is interrupted by triggering the commutating circuit to turn off the thyristor, opening the circuit between the input bridge and the inverter.

* * * * *